(12) United States Patent
Nagaya et al.

(10) Patent No.: US 7,379,628 B2
(45) Date of Patent: May 27, 2008

(54) RECORDING AND REPRODUCING SYSTEM FOR IMAGE DATA WITH RECORDING POSITION INFORMATION AND A RECORDING AND REPRODUCING METHOD THEREFOR

(75) Inventors: Shigeki Nagaya, Tokyo (JP); Seiichi Hirai, Koshigaya (JP); Hirotada Ueda, Kokubunji (JP)

(73) Assignees: Hitachi, Ltd., Tokyo (JP); Hitachi Kokusai Electric Co., Ltd., Tokyo (JP)

( * ) Notice: Subject to any disclaimer, the term of this patent is extended or adjusted under 35 U.S.C. 154(b) by 761 days.

(21) Appl. No.: 10/777,096

(22) Filed: Feb. 13, 2004

(65) Prior Publication Data

US 2004/0247205 A1    Dec. 9, 2004

(30) Foreign Application Priority Data

Jun. 6, 2003    (JP) .............................. 2003-161642

(51) Int. Cl.
*G06K 9/54* (2006.01)
(52) U.S. Cl. .................... 382/305; 386/46; 340/506
(58) Field of Classification Search ................ 382/103; 348/143; 396/427; D16/203; 386/92
See application file for complete search history.

(56) References Cited

U.S. PATENT DOCUMENTS

| | | | |
|---|---|---|---|
| 6,292,098 B1* | 9/2001 | Ebata et al. ................ 340/506 |
| 7,171,106 B2* | 1/2007 | Elberbaum .................... 386/46 |
| 2001/0029511 A1 | 10/2001 | Burda et al. |
| 2001/0043524 A1 | 11/2001 | Utsumi |
| 2002/0067909 A1 | 6/2002 | Iivonen |
| 2002/0112244 A1 | 8/2002 | Schollmeier et al. |
| 2003/0011678 A1* | 1/2003 | Chun ......................... 348/143 |

FOREIGN PATENT DOCUMENTS

JP    11-250578    9/1999

* cited by examiner

*Primary Examiner*—Jingge Wu
*Assistant Examiner*—Jayesh A Patel
(74) *Attorney, Agent, or Firm*—Mattingly, Stanger, Malur & Brundidge, P.C.

(57) ABSTRACT

An image data recording and reproducing system comprises an image data input unit, an ID generator generating an ID inserted to image data from the image data input unit, a plurality of image data recorders for recording the image data, and an output unit for outputting the image data recorded into the plurality of image data recorders, wherein each of the plurality of image data recorders has an ID table and an image data storage area, and an ID of the ID table is matched with image data of the image data storage area on the bases of recording position information of the image data.

12 Claims, 6 Drawing Sheets

RECORDING AND REPRODUCING SYSTEM FOR IMAGE DATA WITH RECORDING POSITION INFORMATION AND A RECORDING AND REPRODUCING METHOD THEREFOR

FIELD OF THE INVENTION

The present invention relates to a recording and reproducing system for image data and a recording and reproducing method therefor. More specifically, the present invention relates to a recording and reproducing system for image data and a recording and reproducing method therefor capable of transmitting, recording and browsing image data on the Internet or a local area network.

BACKGROUND OF THE INVENTION

In the image system field (hereinafter, called an image system) including a video surveillance system and an image delivery system, the need for an image transmission unit transmitting image data on an IP (Internet Protocol) network such as the Internet or LAN (Local Area Network) as a transmission line is increasing rapidly. In such image system, a combination of a camera and an image transmission unit or a network camera (referring to a camera integrated with an image transmission unit) is used and a recorder (hereinafter, called a video server) directly recording image data therefrom via a network is becoming mainstream. The above-described image transmission unit is a unit which, in order to transmit an image picked up by a camera to a network, compresses the image by MPEG2 (Moving Picture Expert Group Phase 2) or MPEG4 to convert it to image stream data (hereinafter, called image data).

A prior art camera transmits image data in an analog form of the NTSC system as a TV standard system using a coaxial cable. The camera transmits the image data as an analog signal so that deterioration due to attenuation or noise occurs during transmission to degrade image quality. In addition, a coaxial cable must be laid for each camera. The cable laying cost is tremendous with longer distance. A remote surveillance system in the actual use is significantly limited.

For image data from the above-described network camera or image transmission unit, an IP network such as the Internet or LAN has already been widely laid in a building or an area and no laying work laying a new IP network is necessary so as to build an image system very easily. As a result, connection to the Internet allows local image data to be viewed very easily in Japan and overseas. When laying a new IP network, wireless LAN is used to just place a relay station. No work providing a transmission line to a camera is necessary to significantly reduce the laying cost.

General personal computer peripheral equipment can be used as-is as equipment for relay transmission. It is much inexpensive than an analog camera. Because of an IP network system, system design in conjunction with various kinds of network components (such as a sensor, personal computer and server) is simplified. For example, in an entering/leaving management system in a building using an IC card, face photograph image data of an entering/leaving person is picked up by a network camera, and then, the frame image data of the person in the face photograph is stored together with an entering/leaving management database to build a high level of security network system in conjunction with the entering/leaving information and the image data.

The image system using an IP network has many advantages as described above. Since the technique and parts as a base are personal computer peripheral equipment, the image system has reliability lower than that of the analog camera system. Unlike the NTSC system, the IP network as a base has an asynchronous communication system assuming data loss, for example, packet discard when transmitting image data in a packet. A computer virus or sudden network load occurs to temporally interrupt image data. At worst, the entire image system can be down.

The personal computer peripheral equipment has equipment level more unstable than that of the analog camera system. Along with higher function and complicating of video equipment such as a camera or a recorder, a high-function and complicated OS (Operating System) such as Windows (Microsoft's trademark) or Linux is employed, and freezing of the image system is found here and there. When requiring a high degree of reliability in the image system, the network or equipment must be subject to duplicating or clustering like the server of a data center.

In the "duplicating" herein, another server performing quite the same function as a generally mainly operated server is prepared for backup, and the main server, which has failed, is switched to the backup server for operating the system continuously, after failure. The backup server must always be subject to mirroring of the main server. The mirroring herein means that the backup server into which the same data as that of the main server is written performs the same operation as that of the main server.

The "clustering" means that in a server configuration system for balancing load concentrated on one server, a plurality of node servers (servers performing actual processing) and a load balancer are used to configure one virtual server. That is, a plurality of node servers consist of Cluster. In the clustering, a failed server is disconnected at failure, and then, the entire another plurality of servers shares the processing of the failed server to operate the system continuously after failure. To apply the clustering, individual node servers must have an equal function and must be subject to mirroring mutually. In addition, each job is independent (or each session is independent) like Web servers to limit the use of service in which no state management is necessary between a client and a server.

In Web servers in which the duplicating technique and the clustering technique are standardly used, each job is basically independent in operation and no state management need be performed between a specific client and server. In the event that fail over occurs, the client can smoothly continue browsing without being affected thereby. The fail over herein means that two servers are operated at the same time and one of them is operated as a main server so that when the main server cannot be operated, the second server quickly takes over the processing as backup.

As a conventionally known multimedia recorder, for example, Japanese Patent Laid-Open Application No. Hei 11-250578 describes a plurality of recording devices and a backup device. The technique shows a technique enabling backup creation without deteriorating fast responsiveness at recording required for event recording.

SUMMARY OF THE INVENTION

In the communication form between a client and a delivering side server of the above-described network image delivery system, a system managing the client on the delivering side is standard. In such system, when the servers must be switched due to some reason such as failure or overload, information managing the reproduction state is lost. Consequently, the state before disconnection cannot be continued and the information can be only obtained from the initial state again. The image data immediately before failure cannot be continuously browsed.

In the system using the duplicating technique or the clustering technique, when database-related link information, for example, recording position information of recorded image data, is mismatched between a plurality of servers, the recording positions of the same image data of the video servers having the same recording capacity are usually quite different depending on the used state. When the video servers are switched due to an accident, the database-related link information indicates quite non-related image data. When the database-related link information is mismatched between the plurality of video servers and the video servers are switched due to failure, the job cannot be taken over smoothly between a specific client and server. To build a highly reliable system, a set of databases must be unit between the plurality of video servers for duplicating or clustering. The system is so large that there is a significant problem in cost, operation, and system extensibility.

One object of the present invention is to provide a recording and reproducing system for image data and a recording and reproducing method therefor capable of equivalently accessing a plurality of video servers.

Another object of the present invention is to provide a recording and reproducing system for image data and a recording and reproducing method therefor capable of correctly using recording database-related link information when distributively recording image data into a plurality of video servers for duplicating or clustering.

Another object of the present invention is to provide a recording and reproducing system for image data and a recording and reproducing method therefor capable of minimizing the system resources of a video server when recording link information into a database.

Another object of the present invention is to provide a recording and reproducing system for image data and a recording and reproducing method therefor capable of using recording database-related link information without being affected by time variation.

Further object of the present invention is to provide a recording and reproducing system for image data and a recording and reproducing method therefor capable of integrally generating image data and link information.

To achieve the above object, an image data recording and reproducing system of the present invention comprises an image data input unit, an ID generator for generating an ID generated to image data from the image data input unit, a plurality of image data recorders for recording the image data, and an output unit for outputting the image data recorded into the plurality of image data recorders, wherein each of the plurality of image data recorders has an ID table and an image data storage area, and an ID of the ID table is matched with image data of the image data storage area on the bases of recording position information of the image data.

An image data recording and reproducing system of the present invention further comprises a load balancer and an output terminal device connected to the output unit, wherein the load balancer manages the load factor of each of the plurality of image data recorders and image data requirement from said output terminal unit is transferred to any one of the predetermined plurality of image data recorders on the bases of the load factor of each of the plurality of image data recorders.

A recording and reproducing method for image data of the present invention comprises the steps of: generating a plurality of image data; and adding an identifiable ID to each of the plurality of image data; wherein when recording the image data with the ID added into a plurality of image data recorders, each of the plurality of image data recorders has an ID table and an image data storage area, and an ID of the ID table and image data of the image data storage area are stored corresponding to recording position information of the image data to reproduce predetermined image data from image data recorded into the plurality of image data recorders based on the ID to command for a video replay.

The above and other objects, features and advantages of the present invention will be apparent from the following detailed description of illustrative embodiments which is to be read in connection with the accompanying drawings.

DETAILED DESCRIPTION OF THE ILLUSTRATED EMBODIMENTS

Figure 1:
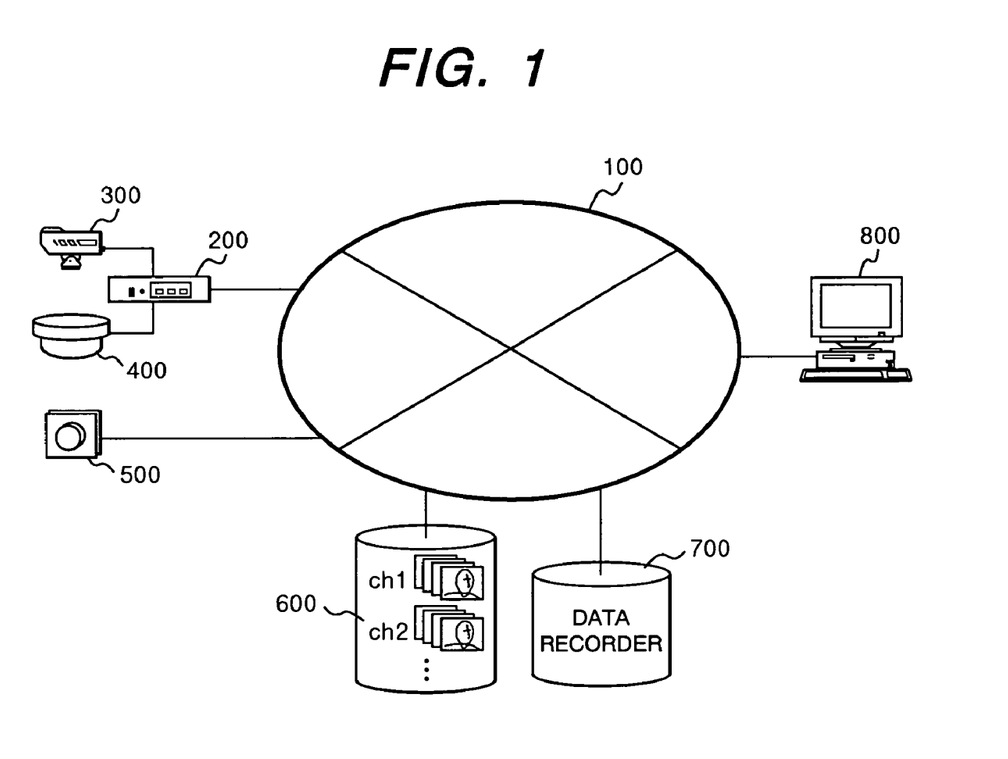
FIG. 1 is a diagram showing the schematic configuration of an embodiment of the present invention.

FIG. 1 is an image recording and reproducing system diagram of assistance in explaining an embodiment of the present invention. In FIG. 1, the numeral 100 denotes an IP network (hereinafter, simply called a network, which may be a transmission line) performing communication by the TCP (Transmission Control Protocol)/IP protocol such as wired LAN, wireless LAN or the Internet, the numeral 200 denotes an image transmission unit, and the numeral 300 denotes an image pick-up unit picking up an object, e.g., a television camera. The numeral 400 denotes a sensor, e.g., an infrared sensor detecting the presence or absence of an intruder in an intruder surveillance system or a water level sensor detecting the water level of a dam. The image transmission unit 200 is a unit converting the outputs of the camera 300 and the sensor 400 to IP data to output them to the network 100. That is, it compresses the image data output of the camera 300 to a form such as JPEG, MPEG2 or MPEG4 to encode it for converting it to IP data, and superimposes sensor information from the sensor 400 on the IP image data for outputting it to the network 100.

The numeral 500 denotes a network camera. The network camera 500 integrates the camera 300 with the image transmission unit 200. Image data from the network camera 500 is outputted as IP data directly to the network 100. The numeral 600 denotes a video server and is a unit recording image data transmitted from the image transmission unit 200 or the network camera 500. The numeral 700 denotes a data recorder (database unit) for registering sensor information and link information (ID) specifying image data related to the sensor information when the sensor information is superimposed on the image data. Typically, the surveillance system is given picking up dates of the image data by a timer incorporated into (or externally provided of) the camera 300 or the network camera 500. These times are stacked onto the data recorder 700 together with an ID.

The numeral 800 denotes a client terminal and is realized by a personal computer (PC) or an exclusive hardware configuration. The client terminal 800 is used for reproducing live image data transmitted from the image transmission unit 200 or the network camera 500, reproducing image data recorded into the video server 600, or reproducing data recorded into the data recorder 700. The client terminal 800 has a function for controlling, by a conventionally known method, the operation of pan, tilt and zoom (A rotating mechanism such as a PT (Pan/Tilt) unit is not shown.) of the camera 300 or the network camera 500 and the operation of the sensor 400, as necessary.

In FIG. 1, one image transmission unit 200, one camera 300, one sensor 400 or one network camera 500 are representatively shown. Typically, several to several tens of image transmission units 200, cameras 300, sensors 400 or network cameras 500 are connected to the network 100 to configure the image recording and reproducing system. Also, typically, the client terminals 800 are installed in a plurality of places.

Figure 2:
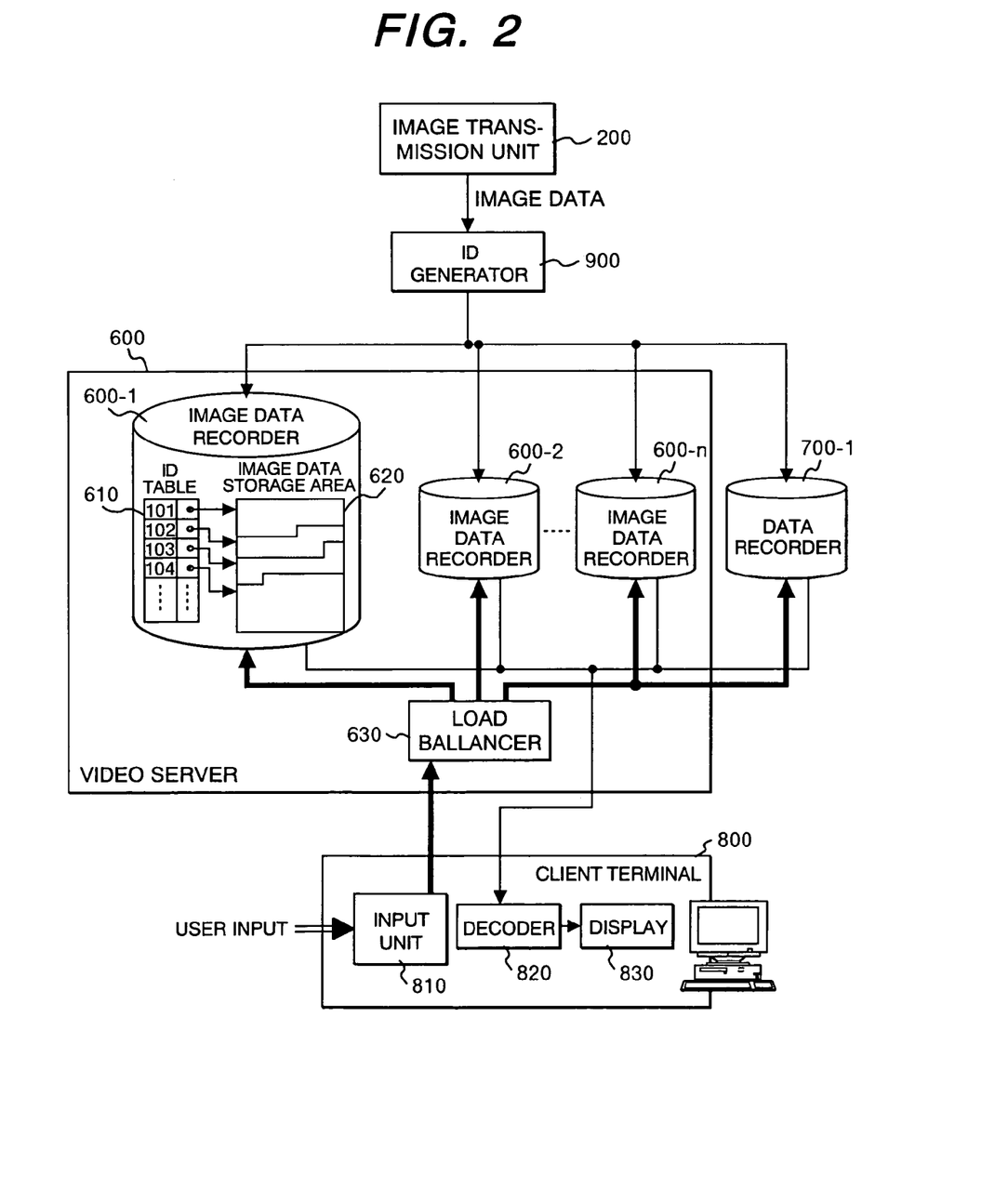
FIG. 2 is a diagram showing the specific configuration of an embodiment of the present invention shown in FIG. 1.

FIG. 2 is a block diagram of assistance in explaining the specific configuration of an embodiment of the present invention. In FIG. 2, the video server 600 consists of a plurality of image data recorders 600-1, 600-2, . . . 600-*n* subject to clustering. The numeral 610 denotes an ID (Identification) (also called link information) table, and the numeral 620 denotes an image data storage area. The ID table 610 and the image data storage area 620 are schematically shown and mean a storage area recorded onto a recording medium such as a hard disk (HD), an optical disc or a DVD (Digital Versatile Disc) in the image data recorder 600-1. The ID table 610 may be stored in semiconductor memory when high-speed retrieval is required. The numeral 630 denotes a load balancer and the detail will be described later. The numeral 700-1 denotes a data recorder which is not necessarily required and is provided when needing to stack time information or sensor information, as described later. The data recorder 700-1 can be also used serving as one of the image data recorders 600-*n* and need not be physically discriminated. The client terminal 800 has an input unit 810, a decoder 820 and a display 830. The numeral 900 denotes an ID generator and the detail will be described later. The same things as FIG. 1 are designated by similar numerals. In FIG. 2, the network 100 is omitted and the transmission line between the image transmission unit 200 and the video server 600 and the transmission line between the client terminal 800 and the video server 600 correspond to the network 100. The details of an ID will be described later.

The system operation shown in FIG. 2 will be described. First, recording of image data will be described. Image data outputted from the image transmission unit 200 is inputted to the ID generator 900. Various modifications of the installing place of the ID generator 900 can be made. For convenience, the case that it is located between the image transmission unit 200 and the transmission line 100 will be described here. The ID generator 900 inserts an image data reference unit (or an image data reproduction unit), e.g., an ID (or ID information) for each TV frame, into the image data outputted from the image transmission unit 200, and outputs it to the network 100.

The image data to which the ID is inserted (or attached) is transmitted and recorded into all of the plurality of recorders 600-1, 600-2, . . . 600-*n*. For example, in the image data recorder 600-1 as a node server, the image data is recorded into the image data storage area 620 on the hard disk in the server, and recording position information on the decided area is matched with the inserted ID for recording into the ID table 610.

Figure 7A:
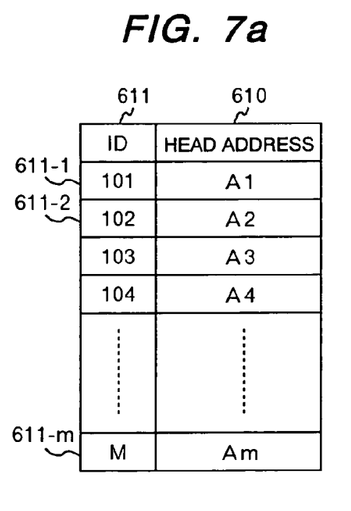
FIG. 7 is a diagram of assistance in explaining a table of data recorded into an image data recorder of an embodiment of the present invention.
Figure 7B:
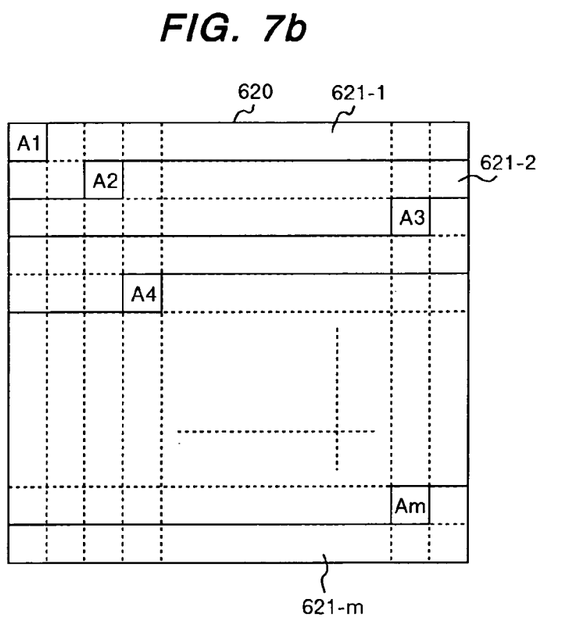

The relation between the ID table 610 and the image data storage area 620 will be described in detail using FIG. 7. FIG. 7(*a*) shows the ID table 610 and FIG. 7(*b*) shows the recorded contents of the image data storage area 620. When image data is inputted to the image data recorder 600-1, it is stored in an area 621-1 on the image data storage area 620 together with header address (position information) A1, as shown in FIG. 7(*b*). An ID inserted to the image data and the position information A1 of the area 621-1 are stored in a record 611-1 (indicated by a record 611 for the generic name for the records) on the ID table 610, as shown in FIG. 7(*a*). That is the ID (e.g., indicated by #101) and the position information A1 are stored in the record 611-1.

When new image data is inputted, it is stored in an area 621-2 on the image data storage area 620 together with header address (position information) A2. For an ID inserted to the image data and the position information A2 of the area 621-2, the ID (indicated by #102) and the position information A2 are stored in a record 611-2 on the ID table 610. Thereafter, each time new image data is inputted, it is sequentially recorded into the image data storage area 620 and position information Am (m: 1, 2, . . . ) of the image data storage area 620 and IDs (#M) (M=101, 102, . . . ) are sequentially stored in the record 611.

Each time image data is transmitted, the above processing is repeated. When there is no space in the image data storage area 620, old data are sequentially overwritten by the latest data. That is, the recorded contents are updated. New data is added to the ID table 610 according to this. When there is a record whose referred side is updated by overwriting of the image data storage area 620, it is erased. The image data recorder 600-1 is described above in detail. Image data from the ID generator 900 and ID information inserted to each image data are inputted to the image data recorders 600-2, . . . 600-*n* as in the image data recorder 600-1 and are stored in the ID table and the image data storage area owned by each of the image data recorders by the same method. The detailed description is omitted.

In the case of image data to which its picking up date is attached as time information, the time information is recorded into the data recorder 700-1 together with an ID, as in FIG. 7. That is, the time information is recorded into a location corresponding to the image data storage area. The ID, time information and recording position information of the time information are the same as those shown in FIG. 7. The image data recorders 600-1, 600-2, . . . 600-*n* are large capacity storage devices having a recording capacity enough for stacking picked-up image data for about three days to one month.

Reproduction of image data will be described. When command for a video replay is given from the user to the client terminal 800, the input unit 810 generates command for a video replay based on command for image requirement to transmit it to the network video server 600 subject to clustering. At this time, an ID specifying the recording location of the recorded image data is added to the command for image requirement. The image requirement input (query input) and the display screen of the client terminal 800 will be described using FIG. 8.

Figure 8:
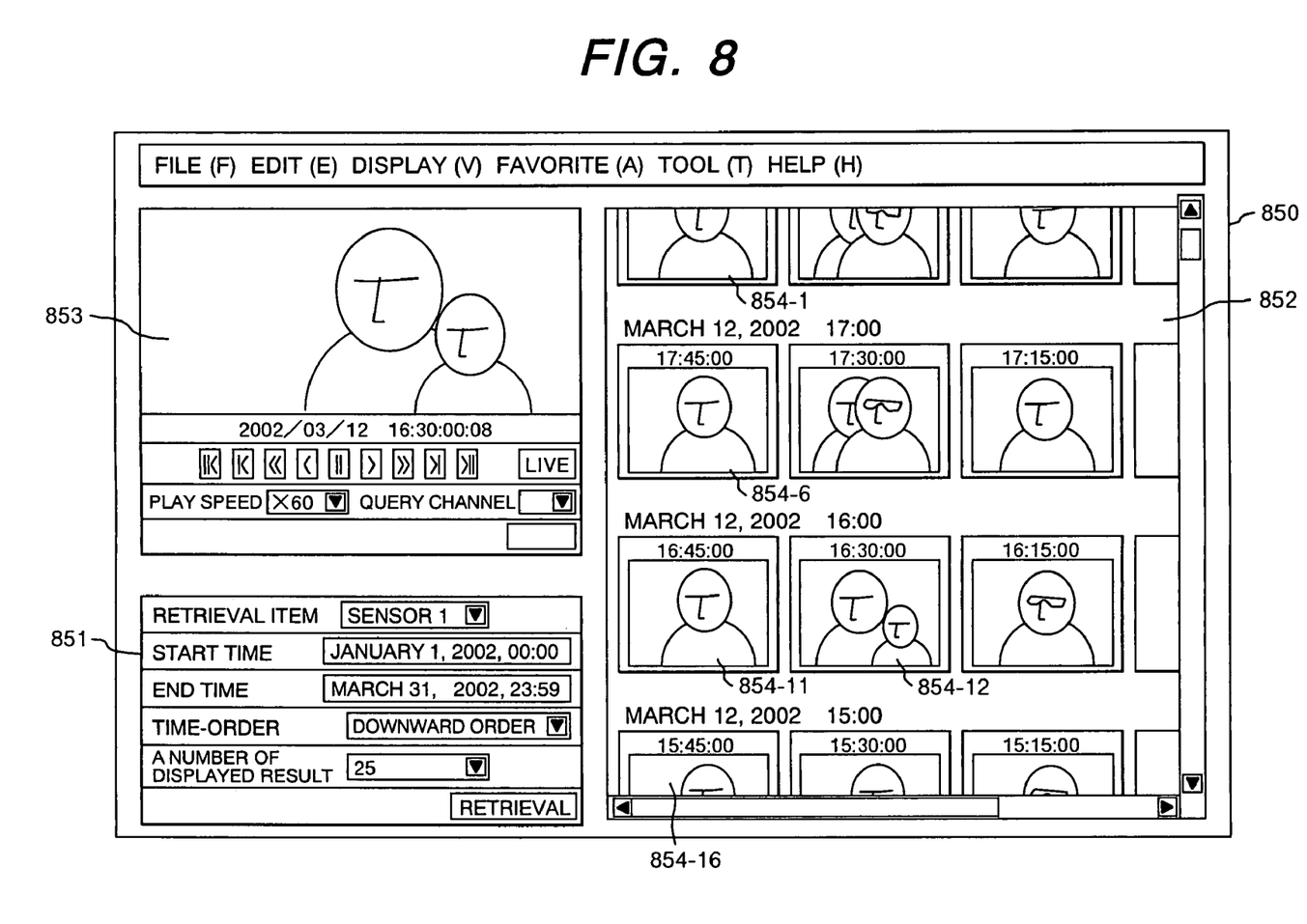
FIG. 8 is a diagram showing a display screen of a client terminal used for the present invention.

The client terminal 800 has an input unit 810 such as a keyboard, a decoder 820 decoding image data, and a display 830, and an embodiment of its retrieval and result display screen is shown in FIG. 8. The numeral 850 in FIG. 8 is a retrieval and result display screen. The retrieval and result display screen 850 has a retrieval condition specification screen 851, a retrieval result list display screen 852, and a reproduction screen 853.

Sensor 1 is specified as a retrieval item from the client terminal 800 by the input unit 810 such as a keyboard on the retrieval condition specification screen 851 for command for a video replay. In this case, the sensor 1 corresponds to No. 1 camera of the image picking up cameras. In addition, retrieval start time: Jan. 1, 2002, 00:00 and retrieval end time: Mar. 31, 2002, 23:59 are inputted, downward order is inputted for time order, and 25 images are inputted for a number of displayed retrieval result to click the retrieval button.

When the retrieval condition is inputted from the client terminal 800, the ID corresponding to the retrieval start time and the retrieval end time of the retrieval condition is read from the data recorder 700-1, and the scaled-down images (thumbnail images) of image data corresponding to the ID are read from the video server 600 via the load balancer 630 so as to be displayed on the retrieval result list display screen 852 as scaled-down images 854-1, 854-2, ... 854-25 (The retrieval result of 25 images is displayed). The scaled-down image (thumbnail image) 854 of the image data has pixels obtained by reducing the number of pixels of one frame image and is an image for displaying a large number of images in the retrieval result list display screen 852. In the scaled-down image 854, all the scaled-down images of a series of picked-up images are not displayed. A conventionally well-known scaled-down image of a frame with changed images is selected and displayed as representative image data. The image picking-up date is also displayed on the retrieval result list display screen 852 according to the need of the user.

The operation of the load balancer 630 will be described. When reading image data from the image data recorders 600-1, 600-2, ... 600-n according to the inserted ID, the load balancer 630 refers to the load state of the video server 600 as the node server in the Cluster to transfer command for a video replay from the client 800 to the server having the lowest load. The load balancer 630 switches the connected sides according to the load of the image data recorders 600-1, 600-2, ... 600-n to the command for a video replay from a plurality of client terminals 800 connected to the network 100 and transfers the command for a video replay. For example, the load balancer 630 has in its inside a table of the image data recorders as shown in Table 1.

TABLE 1

| Image data recorder No. | Load factor (a number of command for a video replay) |
|---|---|
| 600-1 | 40% |
| 600-2 | 100% |
| . | . |
| . | . |
| . | . |
| 600-n | 60% |

Table 1 shows a load factor for each of the image data recorders at a predetermined point. The load factor herein expresses a number of command for a video replay accessed from the client terminal to each of the image data recorders as %. When command for a video replay is given from the client terminal 800, the load balancer 630 refers to the table 1 and transfers the command for a video replay to the image data recorder having a low load factor. For example, the load factor of the image data recorder 600-1 is 40% and is lowest. The command for a video replay is transferred to the image data recorder 600-1. In the round robin method often used or in the so-called method for sequentially transferring command for a video replay to the image data recorders 600-1, 600-2, ... 600-n for each occurrence of command for a video replay, the load factors of all the image data recorders can be almost uniform. Whether the operation of the load balancer 630 is done by a table lookup method or by the round robin method is decided by the design of the image system or the used state of command for a video replay.

The image data recorder which has received the transferred command for a video replay, for example, the image data recorder 600-1, searches the ID table 610 based on the ID inserted to the command for a video replay. When there is the corresponding record, the image data is read from the hard disk based on the position information Am in the image data storage area 620 written thereinto to transmit it to the client terminal 800. The received image data is decoded by the decoder 820 for suitably performing reduced image processing and is displayed as the scaled-down image 854 on the retrieval result list display screen 852 on the display 830.

The reproduction screen 853 on the display 830 will be described. The reproduction screen 853 shows a screen reproducing image-data (image data picked-up by the camera and recorded) recorded into the video server 600. For example, when the user clicks the scaled-down image 854-12 of the retrieval result list display screen 852 by a mouse, command for a video replay is inputted to the load balancer 630 together with the ID attached to the scaled-down image 854-12. As in the display of the above-described scaled-down image 854, the command for a video replay is suitably transferred according to the load state of the image data recorders 600-1, 600-2, ... 600-3 to reproduce necessary image data. The reproduction screen 853 shows the case of reproducing image data of Mar. 12, 2002, 16:30:00:08. In the image data, a still image or a moving image can be reproduced and its replay speed can be freely changed. When the reproduction operation is continuously performed, the above processing is repeated. The image data recorder to which command for a video replay is transferred by the load balancer 630 is suitably switched by the load state (shown in Table 1) of each of the image data recorders for the occasion. As described above, an ID is shared. The corresponding image data can be readily outputted. The load balancing processing for the entire Cluster, that is, the video server 600, is realized.

An ID inserted to the above image data will be described. When ensuring that all IDs are not overlapped, any ID may be used. In consideration of the transmission capacity and the recorder capacity, the amount of data is desirably as small as possible. In view of the reproduction processing, when an ID inserted (or attached) is ordered and successive, the absence of missing can be easily decided so that it is desirable as an ID. For example, suppose that the client 800 requires image data by a predetermined ID. When ensuring that IDs are not overlapped and an inserted ID is quite at random, the image data recorder 600-1 which has received command for a video replay cannot decide whether image data corresponding to the required ID is within the image data recorder 600-1 unless all IDs of the ID table 610 are checked. As described above, when the ID table 610 cannot be on the semiconductor memory because the hard disk capacity of the image data recorder 600-1 is very large and some IDs are arranged on the hard disk, the search time of the ID table is 100 times longer than the semiconductor memory not including the table. The response in the case that there is no image data with a required ID is significantly lowered. When an ID inserted is ordered and successive, the header and last IDs of the ID table 610 are checked and whether a required ID is within its range is checked, thereby easily deciding the presence or absence of image data. Generation of an ordered and successive ID is convenient for image data retrieval.

As an embodiment of an ID satisfying the above condition, a method for employing a natural number will be described. The ID generator 900 incorporates a counter (or an ID generation unit) for generating an ID. The counter is initialized to 1 at product shipping. The system is installed and operated, and each time ID insertion is required to the ID generator 900, the internal counter is incremented by 1 to output the corresponding ID from the output unit, not shown. In this case, initialization of the counter must not be permitted during that at all. The ID is a finite bit number. When the counter is returned to 0 again, ID overlapping may occur. For example, in the case of a TV, when IDs are generated to all frame images for keeping on ID increment by 30 frames per second, a natural number of about 40 bits corresponds to frame images for about 1159 years. No practical problem in ID insertion occurs.

In combination of the ID with the MAC address (48 bits) as an inherent ID well-known as network equipment, an only ID can be allocated at frame image level. In this case, about 88 bits is necessary. The bit length released for each company shipping a network card in the MAC address is 24 bits (=16,777,216). The use of this can generate an ID with a shorter bit length.

The system application range is limited. When 24 bits is allocated as a product number allocated to the network image transmission unit 200 or the network camera 500 and 40 bits is allocated to the counter in the ID generator 900, a practically sufficient ID can be used by about 64 bits. The ID of such counter output can easily be an ID combined with a camera number or a sensor number.

In the surveillance system, the image picking up time of the camera is often used as the ID of image data. A time code with the time as an ID tends to be considered to substantially satisfy the ID condition. When image data from a plurality of cameras are supplied to the network 100, time shift occurs between the plurality of cameras. Unless this is solved, the time code cannot be used as an ID. A clock used for general IT (Information Technology) equipment counts time using the oscillation of a crystal oscillator. Since each crystal oscillator has an error, time is shifted little by little. To cope with such problem, the network 100 uses NTP (Network Time Protocol) to adjust the time of the equipment on the network 100. The operation sets the clock forward or backward in the IT equipment whose time is shifted.

The target image system handles image data. The minimum unit of an allowed time shift is 16 ms corresponding to one field (half of one frame) of image data. In a general personal computer, a shift to this degree occurs every three to six days. It is difficult to ignore the time shift. In general, the network 100 itself is a medium allowing delay, which does not ensure that time correction of the NTP is complete. Consequently, when a time code is generated as an ID to image data, ID overlapping or missing occurs.

There is a currently practical electric wave clock as a very precise clock. This corrects time for each hour. The electric wave clock is provided in the ID generator and a time code is used as an ID, thereby significantly improving the above time problem. With correction for each hour, an error during that occurs. It is desirable that a more precise electric wave clock appear. When such precise electric wave clock is realized, a time code can be used as an ID. Currently, the unit prices of the peripheral parts of the electric wave clock are still expensive and are difficult to employ for an actual system. When these unit prices are very inexpensive, a time code of the electric wave clock can be sufficiently used as an ID.

Figure 3:
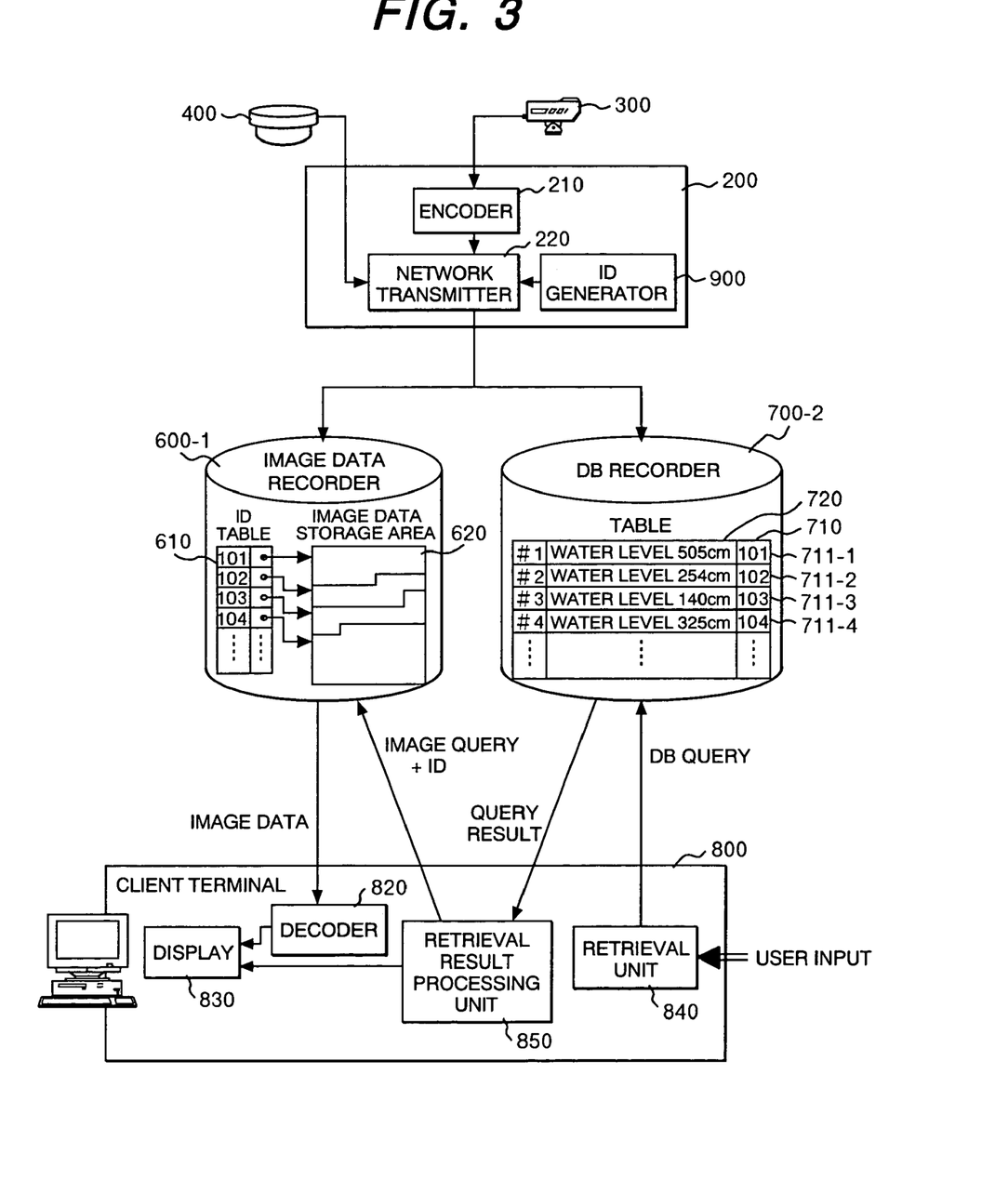
FIG. 3 is a diagram of assistance in explaining another embodiment of the present invention.

FIG. 3 is a block diagram of assistance in explaining another embodiment of the present invention and shows a water level surveillance system of a dam recording image data along with a sensor obtaining water level information. An image transmission unit 200 in FIG. 3 has an encoder 210, a network transmitter 220, and an ID generator 900. The numeral 700-2 is a DB (Data Base) recorder (or data recorder) recording water level information from a sensor 400. The numeral 710 denotes a data table matching an ID inserted corresponding to image data with water level information 720 corresponding to image data. A client terminal 800 has a display 830, a decoder 820, a retrieval unit 840, and a retrieval result processing unit 850. The same things as FIGS. 1 and 2 are designated by similar numerals. This embodiment shows the case that the ID generator 900 is incorporated into the image transmission unit 200. Multicast (a multi-destination transmission method to specified sides) is performed to an image data recorder 600-1 and the DB recorder 700-2 for saving a network transmission bandwidth.

The operation of the water level surveillance system shown in FIG. 3 will be described. The outputs from a camera 300 and the sensor 400 are inputted to the image transmission unit 200. The analog image data output from the camera 300 is A/D converted by the encoder 210, is compressed and encoded to JPEG (Joint Photographic Experts Group) or MPEG by the network transmitter 220, and becomes IP data together with sensor information (water level information) from the water level sensor 400. The above ID is generated in an image reference unit (for example, in one frame) by the ID generator 900 to be outputted to the network 100.

The image data and the sensor information (water level information) to which the IDs are inserted (or attached) are transmitted to the image data recorder 600-1 and the DB recorder 700-2. In the image data recorder 600-1, as explained in FIG. 2, the image data is recorded into an image data storage area 620 on the hard disk in the image data recorder 600-1, and recording position information on the decided area is matched with the inserted ID for recording into an ID table 610.

The relation between the image data storage area 620 and the ID table 610 is the same as that shown in FIG. 7. When image data is inputted, it is stored in an area 621-1 on the image data storage area 620. An ID (in this case, #101) generated to the image data and position information A1 on the area 621-1 are stored in a record 611-1 on the ID table. When new image data is inputted, position information A2 of an area 621-2 and an ID (#102) inserted to the image data are stored in a record 611-2. Thereafter, each time new image data is inputted, position information Am (m=1, 2, . . . ) of the area 620 and IDs (#M) (M=101, 102, . . . )

are sequentially stored in records 611-*m*. Each time image data is transmitted, the above processing is repeated. When there is no space in the image data storage area 620, old data are sequentially overwritten by the latest data. The ID table 610 adds new data according to this. When there is a record whose referred side is updated by overwriting of the image data storage area 620, it is erased. The image data is also transmitted to the DB recorder 700-2, but is not used in the DB recorder 700-2 and is discarded.

When the sensor information (water level information) is inputted in the DB recorder 700-2, it is added as a new record to the table 710 managing sensor information. At this time, the ID attached thereto is also stored together in the same record. For example, when image data stored in the area 621-1 on the image data storage area 620 is transmitted from the image transmission unit 200, sensor information (in this case, indicated by "water level of 505 cm") and ID information (in this case, indicated by "101") are stored in a first record 711-1 of the table 710 managing sensor information. When new sensor information is received, sensor information (in this case, indicated by "water level of 254 cm") and ID information (in this case, 102) are stored in a record 711-2. Each time new sensor information is received, sensor information (in this case, "water level height" information) and ID information are sequentially stored in a record 711. Each time data is transmitted, the above processing is repeated. When there is no space in the table 710 managing sensor information, old data are sequentially discarded and are overwritten by the latest data to be updated. To the DB recorder 700-2, image data is multicast from the image transmission unit 200, which is not recorded and is discarded. In this embodiment, the DB recorder 700-2 is described. For example, the image data recorder 600-2 shown in FIG. 2 serves as it. In particular, the DB recorder need not be discriminated from the image data recorder at all.

A method for retrieving information recorded into the image data recorder 600-1 and the DB recorder 700-2 will be described. When a DB query from the user is given to the client terminal 800, the retrieval unit 840 transmits a command statement describing the query condition, for example, an SQL statement, to the DB recorder 700-2. For example, information query in which the DB query from the user is water level of 300 cm or above is instructed. The DB recorder 700-2 which has received the DB query searches the table 710 managing sensor information, collects records corresponding to the given condition, and sends back them as query result to the client 800. In the above case, water level information "505 cm" stored in the record 711-1 corresponding to information of a water level of 300 cm or above, an ID "101" attached thereto, water level information "325 cm", and an ID "104" attached thereto are transmitted to the retrieval result processing unit 850.

The retrieval result processing unit 850 isolates and extracts the water level information and the ID from the received query result, processes sensor information display data so as to display it to the user in a suitable form, and displays it on the display 830. In relation to the water level information, when dam image data is necessary, IDs attached to the water level information, or "101" and "104" in the above case, are transferred to the image data recorder 600-1 together with an image query. The image data recorder 600-1 searches the ID table 610 based on the IDs "101" and "104" with the image query. After the search, when there is the corresponding record, image data is read from the image data storage area 620 based on position information written thereinto and is transmitted to the client 800. In the above case, image data are read based on the position information A1 and A4 corresponding to the IDs "101" and "104" from the corresponding areas 621-1 and 621-4 of the image data storage area 620 and are transferred to the decoder 820.

The decoder 820 decodes the transmitted image data, processes it so as to display it on the display 830, and displays it on the display 830 together with the water level information from the retrieval result processing unit 850. As shown in FIG. 8, the display form can be displayed as a reduced image 854 on a retrieval result list display screen 852 by a known method, or can be displayed as a still image or moving image of the picked-up image data on a reproduction screen 853. In this embodiment, the image data recorder 600-1 and the DB recorder 700-2 are described as independent node servers. As described in FIG. 2, these servers are subject to clustering and can be operated in the load balanceable state.

Figure 4:
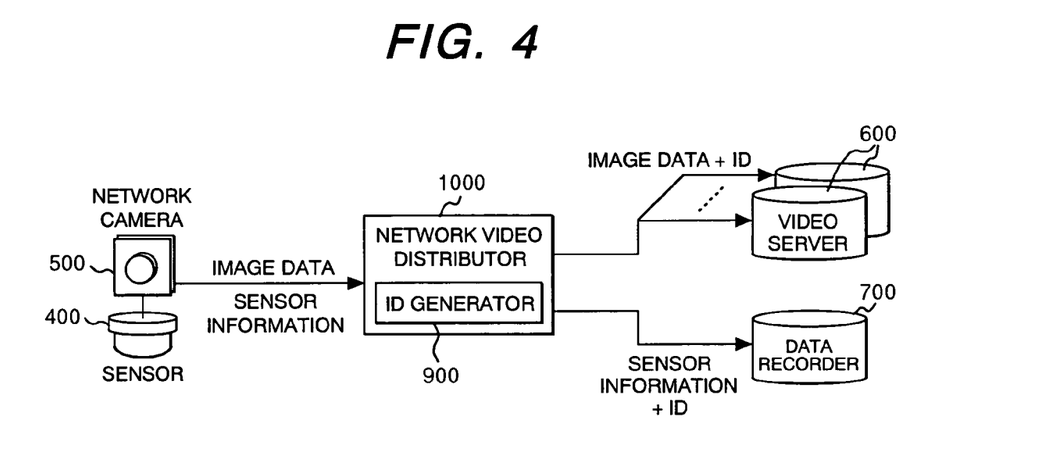
FIG. 4 is a diagram of assistance in explaining the schematic configuration of another embodiment of the present invention.
Figure 5:
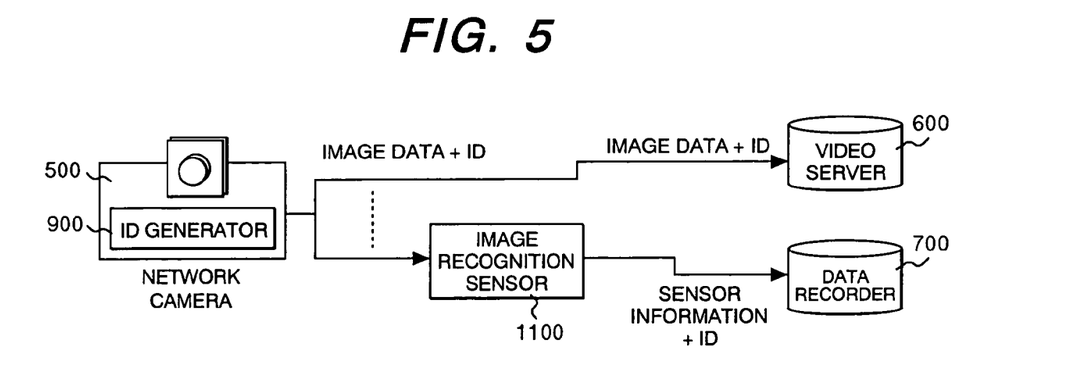
FIG. 5 is a diagram of assistance in explaining the schematic configuration of another embodiment of the present invention.
Figure 6:
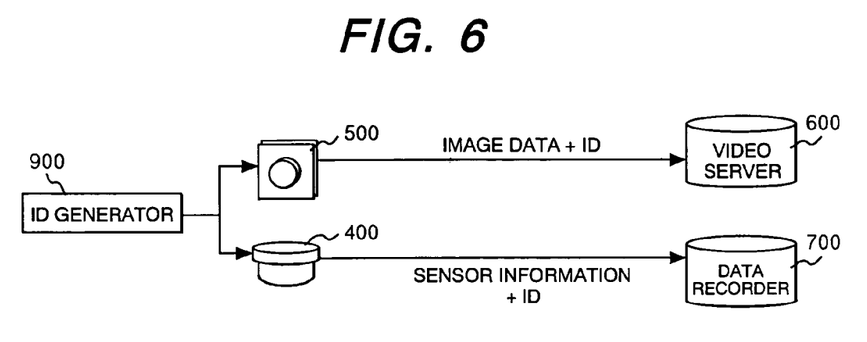
FIG. 6 is a diagram of assistance in explaining the schematic configuration of further embodiment of the present invention.

Another embodiments of the present invention will be described using FIGS. 4, 5 and 6. FIGS. 4 to 6 are schematic configuration diagrams of the embodiments of the present invention classified depending on in what place of the image recording and reproducing system an ID generator 900 is located.

In FIG. 4, an ID generator 900 is provided in the same location as described in FIGS. 2 and 3. By way of example, a plurality of video servers 600 are connected to a network 100, the amount of data inputted to a data recorder 700 is large so that it is unsuitable to transmit image data, and it is difficult to match the data recorder 700 with a multicast protocol.

A network camera 500 transmits image data to a network video distributor 1000 together with sensor information outputted from a sensor 400. The network video distributor 1000 is a unit isolating the sensor information superimposed on the image data from the image data and distributing and transmitting them to the video servers 600 and the data recorder 700. The network video distributor 1000 incorporates the ID generator 900 and inserts (or attaches) an ID to each of the isolated image data and sensor information. When a plurality of video servers 600 exist, the image data and an ID attached thereto are multicast, as described in FIG. 3. The sensor information is transmitted to the data recorder 700 by an exclusive protocol. In FIG. 4, the network camera 500 is physically separated from the network video distributor 1000. These may be integrated. A unit combining a distribution function with an ID generation function is provided to make the network configuration in an image system flexible and to optimize the amount of information transmitted on a transmission line.

FIG. 5 is a schematic configuration diagram showing a system configuration combined with an image recognition sensor. An image recognition sensor 1100 is connected to a network camera 500 and its output is stored in a data recorder 700. Image data is stored in a plurality of video servers 600. In the image recognition sensor 1100 of an intrusion surveillance system, when an intruder intrudes into a specified location, the image recognition sensor 1100 senses it by image processing and outputs information on the presence of an intruder.

In FIG. 5, the network camera 500 is integrated with an ID generator 900. Without being limited to the network camera 500, it is integrated with a camera 300. Image data picked-up by the network camera 500 and an ID obtained by the incorporated ID generator 900 are both multicast to the plurality of video servers 600 and the data recorder 700. The video servers 600 record image data received by the same operation as described in FIG. 3. The image recognition sensor 1100 which has received the image data and the ID performs recognition processing from the inputted image data and outputs its recognition result as sensor information. At this time, the ID attached to the image data is attached as-is to the sensor information and transmitted so as to maintain the relation of data between the video servers 600 and the data recorder 700. The mutual processing of image recognition and a database which has been realized only in an independent host can be realized by a network environment very easily.

For example, the case of building a moving object detection system by the system configuration of FIG. 5 will be considered. The image recognition sensor 1100 is equipped with a moving object detection function. This can be realized by a prior art image processing technique. The brightness levels of the current image data and the previous image data picked-up by the network camera 500 are compared to detect its change, thereby detecting a moving object. The image recognition sensor 1100 discriminates the moving object from the inputted image data and stores numerical values (What the moving body is experimentally defined, previously.) indicating the position, size and certainty of the moving object as sensor information in the data recorder 700 by the above image processing.

A client terminal 800, omitted in FIG. 5, obtains image data from the ID included in the query result from the data recorder 700 and extracts the area of the moving object using specified position and size information to easily build a system creating a moving object list. When the system is equipped with a human face extraction function, another set of the image recognition sensor 1100 equipped with a face extraction function and the data recorder 700 is prepared. The client terminal 800 searches the moving object database and the face image database. It can be easily extended to a system retrieving image data with a moving object and its face.

In a prior art independent host system, when adding the above face image recognition function, the CPU and memory of the host computer are limited. It is difficult to easily extend the system.

FIG. 6 is a diagram of assistance in explaining the schematic configuration of an image system of further embodiment of the present invention. The system is a system realizing, by a minimum amount of communication, image/sensor synchronism when a network camera 500 and a sensor 400 exist to be juxtaposed. That is, it is a system generating a shared ID from an ID generator 900 to the network camera 500 and the sensor 400.

In FIG. 6, in order that the network camera 500 and the sensor 400 have synchronism without mutual communication, the ID generator 900 is arranged in the uppermost stream and the ID is multicast from the ID generator 900. At this time, an ID interval is the same as the frame rate of image data picked-up by the network camera 500. The network camera 500 which has received an ID transmits the ID and image data to a video server 600 for recording them. The sensor 400 which has received an ID attaches the same ID as the ID attached to the image data to sensor information from the sensor 400 and transmits it to a data recorder 700. Building such image system can easily generate a shared ID to image data and sensor information. An image system which can easily record data, retrieve data and be extended can be realized.

With the principle of the present invention, a system seamlessly switching the network camera 500 and the video server 600 can be realized. When live image data is required by a client terminal 800, the client terminal 800 is connected via a network 100 to the network camera 500 to directly display image data picked-up by No. 1 camera of the network camera 500 on the display of the client terminal 800. The client terminal 800 may desire to fetch the past image data picked-up by the No. 1 camera of the network camera 500 from the video server 600 to view the recorded image data. In this case, the processing must be moved in such a manner that the connection must be instantly switched to the video server 600 to view the reproduced image data. In the system of the present invention, a shared ID is generated. The recorded image data of the No. 1 camera of the network camera 500 can be easily fetched from the video server 600 with reference to the ID.

To realize such system by the prior art technique, the client terminal 800 must be constantly connected to the video server 600. Consequently, the picked-up image data from the network camera 500 is displayed for most of the time. System resources of the video server 600 must be constantly allocated to the client terminal 800 whose access frequency for requiring the recorded image data from the video server 600 is low. The system resources are wasteful. In the present invention, only when the video server 600 is accessed, the video server 600 is connected. The utilization efficiency of the video server 600 is increased. The video server 600 need not be operated constantly in synchronization. The design is simplified. The system configuration can be simpler. The system cost can be significantly reduced.

The present invention is described above in detail. The present invention is not limited to the image system, the recording and reproducing system for image data, and the recording and reproducing method therefor, which are described here. It can be widely applied to other image systems, recording and reproducing systems for image data, and recording and reproducing methods therefor.

The present invention has an effect of providing a recording and reproducing system for image data and a recording and reproducing method therefor capable of realizing duplicating or clustering of functions of recording, browsing and reproducing image data photographed by a camera in an image system and offering high reliability. That is, it can realize a recording and reproducing system for image data and a recording and reproducing method therefor capable of equivalently accessing a plurality of video servers. In addition, the present invention can provide a recording and reproducing system for image data and a recording and reproducing method therefor capable of seamlessly switching live image data from a camera and recorded image data of a video server while minimizing system resources such as a CPU, memory and bus bandwidth.

An ID inserted (or attached) to recorded image data and an ID inserted to sensor information are shared to facilitate the conjunction processing of image data and sensor information, thereby minimizing system resources.

For duplicating or clustering, it is possible to provide a recording and reproducing system for image data and a recording and reproducing method therefor capable of correctly using recording database-related link information when image data is distributively recorded into a plurality of video servers.

An image system of the present invention has an effect of realizing a recording and reproducing system for image data and a recording and reproducing method therefor capable of facilitating video server addition or new function extension such as increasing of various pieces of sensor information of recognition and detection.

It is possible to provide a recording and reproducing system for image data and a recording and reproducing method therefor capable of using recording database-related link information without being affected by time variation. Link information (ID) generated is ordered and successive. It is possible to provide a recording and reproducing system for image data and a recording and reproducing method therefor capable of discriminating fast whether a predetermined part of recorded image data is recorded or not, without checking the entire recorded data.

Image data and link information (ID) are integrally generated. It is possible to provide a recording and reproducing system for image data and a recording and reproducing method therefor, which are high in reliability and inexpensive in cost.

It will be appreciated while particular embodiments of the invention have been shown and described, modifications may be made. It is intended in the claims to cover all modifications which come within the true spirit and scope of the invention.

What is claimed is:

1. An image data recording and reproducing system comprising:
    an image data input unit;
    an ID generator coupled with said image data input unit,
    wherein said ID generator generates IDs and each ID is inserted into each of image data from said image data input unit, and
    wherein said ID relates to a video frame, and each ID inserted into each of said image data is different from each other;
    a plurality of image data recorders coupled with said ID generator, to which said image data and said ID are applied,
    wherein said ID and said image data to which said ID is added are recorded in all of the plurality of image data recorders, respectively, and
    wherein each of said plurality of image data recorders has an ID table and an image data storage area, said image data being recorded in said image data storage area, and position information of said image data recorded in said image data storage area being stored in relation to said ID in said ID table;
    a terminal unit for outputting said image data recorded into said plurality of image data recorders,
    wherein when said ID is input in said terminal unit, said image data is output from one of said plurality of image data recorders to said terminal unit in response to said ID;
    a load balancer having a load factor table, coupled with said plurality of image data recorders, for selecting one of said plurality of said image data recorders on the basis of the load factor of said load factor table to output said image data,
    wherein said load factor relates to a number of command applied from said terminal unit.

2. An image data recording and reproducing system according to claim 1, further comprising:
    a sensor information input unit, and a data recording unit for recording sensor information from said sensor information input unit,
    wherein the ID from said ID generator is inserted to sensor information from said sensor information input unit so that said sensor information with the ID inserted is recorded into said data recording unit.

3. An image data recording and reproducing system according to claim 1,
    wherein said terminal unit includes an input terminal unit, and
    wherein based on a retrieval from said input terminal unit, said ID table of one of said image data recorders is referred to reproduce predetermined image data corresponding to an ID of said ID table.

4. An image data recording and reproducing system according to claim 1, wherein an integer of 40 bits or more is used for the ID output from said ID generator.

5. An image data recording and reproducing system according to claim 1, wherein an integer of 40 bits or more is used for the ID output from said ID generator.

6. An image data recording and reproducing system according to claim 2, wherein an integer of 40 bits or more is used for the ID output from said ID generator.

7. An image data recording and reproducing system according to claim 1, further comprising:
    an image data generation unit,
    wherein said ID generator generating the ID inserted to image data from said image data generation unit is integrated with said image data generation unit.

8. An image data recording and reproducing system according to claim 2, wherein the ID inserted to image data from said image data input unit and the ID inserted to sensor information from said sensor information input unit are an ID from a shared ID generator.

9. An image data recording and reproducing system according to claim 1, wherein, said ID generator comprises:
    an ID generation unit for generating a succession of IDs of successive integers.

10. An image data recording and reproducing system according to claim 9, wherein said image data generation unit is a camera, and said ID generator is integrated with said camera.

11. A method for recording and reproducing image data, said method comprising the steps of:
    generating a plurality of image data;
    adding an ID to each of said plurality of image data,
    wherein said ID relates to a video frame and each ID added to each of said image data is different from each other;
    recording said image data with said ID added into a plurality of image data recorders,
    wherein said ID and said image data to which said ID is added are recorded into all of the plurality of image data recorders, respectively,
    wherein each of said plurality of image data recorders has an ID table and an image data storage area, said image data being recorded in said image data storage area, and position information of said image data recorded in said image data storage area being stored in relation to said ID in said ID table; and
    reproducing from said image data recorded into one of said plurality of image data recorders in response to said ID to command for a video replay;
    in the case of said command for a video replay, detecting the load factor of each of said plurality of image data recorders, and transferring said command for a video replay to one of said plurality of image data recorders based on the load factor of said plurality of image data recorders,
wherein said load factor relates to a number of said command.

12. A recording and reproducing method according to claim 11, further comprising the steps of:

obtaining sensor information related to said image data, inserting said ID to said detected sensor information, and recording sensor information with said ID into said image data recorders.

\* \* \* \* \*